US006712369B2

(12) United States Patent (10) Patent No.: US 6,712,369 B2
Wu (45) Date of Patent: Mar. 30, 2004

(54) ANTI-TURNOVER MECHANISM OF ELECTRICAL WHEELCHAIR

(75) Inventor: Donald P. H. Wu, Hsinchu (TW)

(73) Assignee: Pihsiang Machinery Mfg. Co., Ltd., Hsinchu (TW)

( * ) Notice: Subject to any disclaimer, the term of this patent is extended or adjusted under 35 U.S.C. 154(b) by 103 days.

(21) Appl. No.: 10/086,459

(22) Filed: Feb. 28, 2002

(65) Prior Publication Data

US 2003/0159862 A1 Aug. 28, 2003

(51) Int. Cl.[7] .................................................. B62B 9/02

(52) U.S. Cl. .................. 280/5.2; 280/124.1; 280/304.1; 180/907

(58) Field of Search .............................. 280/304.1, 5.2, 280/124.116, 124.179, 5.28, 5.32, 124.109, 124.1; 267/248, 251, 291

(56) References Cited

U.S. PATENT DOCUMENTS 4,310,167 A * 1/1982 McLaurin .................. 280/5.28
5,435,404 A * 7/1995 Garin, III .................... 180/6.5
5,964,473 A * 10/1999 Degonda et al. ......... 280/250.1
6,129,165 A * 10/2000 Schaffner et al. .......... 180/65.1
6,131,679 A * 10/2000 Pulver et al. .............. 180/65.1
6,460,641 B1 * 10/2002 Kral ......................... 180/24.02
6,533,306 B2 * 3/2003 Watkins ................... 280/304.1
6,601,863 B1 * 8/2003 Mentessi et al. ......... 280/304.1
6,655,717 B1 * 12/2003 Wang ......................... 280/781

FOREIGN PATENT DOCUMENTS

CA 2254372 A1 * 5/2000 ............ A61G/5/04

* cited by examiner

*Primary Examiner*—Lesley D. Morris
*Assistant Examiner*—Daniel Yeagley
(74) *Attorney, Agent, or Firm*—Pro-Techtor International Services

(57) ABSTRACT

An electrical wheelchair includes a chassis to which a frame is pivotally mounted. Two casters are rotatably mounted to the frame. At least a resilient member is arranged between the frame and the chassis for supporting the relative position of the frame with respect to the chassis. The resilient member can be deformed to change the relative position of the frame with respect to the chassis to allow the wheelchair to climb over raised surfaces of different heights. The deformation of the resilient member also stores energy therein which may be released when the wheelchair is about to reach the raised surface for enhancing the wheelchair to move over the raised surface. Further, the resilient member also functions to absorb shock caused by the wheelchair moving down a step-like raised surface.

18 Claims, 15 Drawing Sheets

ANTI-TURNOVER MECHANISM OF ELECTRICAL WHEELCHAIR

BACKGROUND OF THE INVENTION

1. Field of the Invention

The present invention relates generally to an electrical wheelchair, and in particular to an anti-turnover mechanism of an electrical wheelchair for operation safety purposes.

2. The Related Art

The improvement of technology and medical care extends life of human beings. The old and the disabled are best benefited from the modern technology and medical care. A lot of different supportive devices have been developed for helping the old and the disabled to transport themselves in an extended area so as to improve their living standard without particular care by other supporting medical personnel. Wheelchairs have been one of the most commonly known supportive devices for the old and the disabled to transport themselves in short distances. However, for those very weak or those having hand or arm injured, they still need other people's help in moving the wheelchairs.

Electrical wheelchairs that are equipped with electrical motors allows a person to drive the wheelchair without great effort and thus are particularly suitable for those whose arms are weak or injured. The electrically powered wheelchairs are also advantageous as compared with vehicles equipped with engines powered by fossil fuels for environmental protection.

The electrical wheelchair comprises two wheels to which electrical motors are mechanically coupled and two front casters for guiding the moving direction of the wheelchair. To ensure a sitter's safety, the electrical wheelchair is equipped with anti-turnover mechanism, which is usually comprised of two rear casters, to prevent turnover of the electrical wheelchair when moving on an uneven road or surface. Climbing over a step-like raised surface is one of the most commonly seen challenges for the wheelchair moving in the uneven road. In climbing over a step, the front casters are moved to the raised top surface of the step first, while the wheels are still on the lower surface, or in moving down the step, the front casters are moved to the lower surface first with the wheel still positioned on the raised top surface of the step. In both situations, the wheelchair is tilted. For raised surfaces of limited heights, the tilting of the wheelchair is within a range wherein the gravity center of the wheelchair is located in the projected bottom area of the wheelchair and turnover of the wheelchair is prevented. However, for a raised surface of a substantial height, attempting to climb over the step may cause turnover of the wheelchair. Thus, anti-turnover mechanism is required for the electrical wheelchair for safety purposes.

FIG. 15 of the attached drawings shows a conventional electrical wheelchair with anti-turnover mechanism. The conventional electrical wheelchair, which is designated with reference numeral 10, comprises a chassis 12 on which a seat 14 is mounted. Two wheels 16 are mounted on opposite sides of the chassis 12 and are coupled to electrical driving units 18, which are often electrical motors, to drive the wheelchair 10 forward and/or backward. The motors 18 are fixed in the chassis 12 and are controlled by a control unit 20 that is located in front of the seat 14 for ready access of a sitter of the wheelchair 10. Two front casters 22 are mounted on the front side of the chassis 12 for smooth movement of the wheelchair 10 and for controlling moving direction of the wheelchair 10.

Two rods 24 that are spaced from each other extend rearward from the chassis 12. A rear caster or anti-turnover roller 26 is rotatably supported by each of the rods 24. The rear caster 26 is in general not contacting the surface of a road when the wheelchair 10 is moving on a substantially flat road. When the wheelchair is climbing a raised surface which causes the chassis 12 to tilt rearward, the rear casters 26 contact the ground surface and prevent undesired over-tilting situation. Thus turnover of the wheelchair 10 is effectively eliminated.

Conventionally, the relative position of the rear casters 26 with respect to the chassis 12 is fixed. In other words, the angle of rearward tilting of the chassis 12 that is allowed by the rear casters 26 is limited, determined by the relative position of the rear casters 26 with respect to the chassis 12. This imposes a constraint to the height of the raised surfaces that the wheelchair can climb.

Furthermore, the rear casters 26 of the conventional electrical wheelchair 10 are not capable to absorb shock caused by dropping down a step-like raised surface. In moving the wheelchair 10 down a step-like raised surface, the wheels 16 often drop down suddenlyl with the rear casters 26 hitting the top surface of the step. This causes an uncomfortable shock to the sitter of the wheelchair.

It is thus desirable to have an electrical wheelchair that overcomes the above problems.

SUMMARY OF THE INVENTION

An object of the present invention is thus to provide a wheelchair having an anti-turnover mechanism that allows the electrical wheelchair to climb over raised surfaces of different heights without causing turnover of the wheelchair.

Another object of the present invention is to provide a wheelchair that is provided with shock absorbing device for absorbing shock caused by moving down a raised surface.

A further object of the present invention is to provide a wheelchair that is provided with energy storing device that stores energy in an initial phase in climbing a raised surface and releases the energy for helping climbing the raised surface in a final phase of the climbing so as to ensure safe and effective operation of the wheelchair in climbing of the raised surface.

To achieve the above objects, in accordance with the present invention, there is provided an electrical wheelchair comprising a chassis to which a frame is pivotally mounted. Two casters are rotatably mounted to the frame. At least a resilient member is arranged between the frame and the chassis for supporting the relative position of the frame with respect to the chassis. The resilient member is deformable to change the relative position of the frame with respect to the chassis for allowing the wheelchair to climb over raised surfaces of different heights. The deformation of the resilient member stores energy therein which may be released when the wheelchair is about to reach the raised surface for enhancing the movement of the wheelchair over the raised surface. Further, the resilient member also functions to absorb shock caused by the wheelchair moving down a step-like raised surface.

BRIEF DESCRIPTION OF THE DRAWINGS

The present invention will be apparent to those skilled in the art by reading the following description of preferred embodiments thereof, with reference to the attached drawings, in which.

DETAILED DESCRIPTION OF THE PREFERRED EMBODIMENTS

Figure 1:
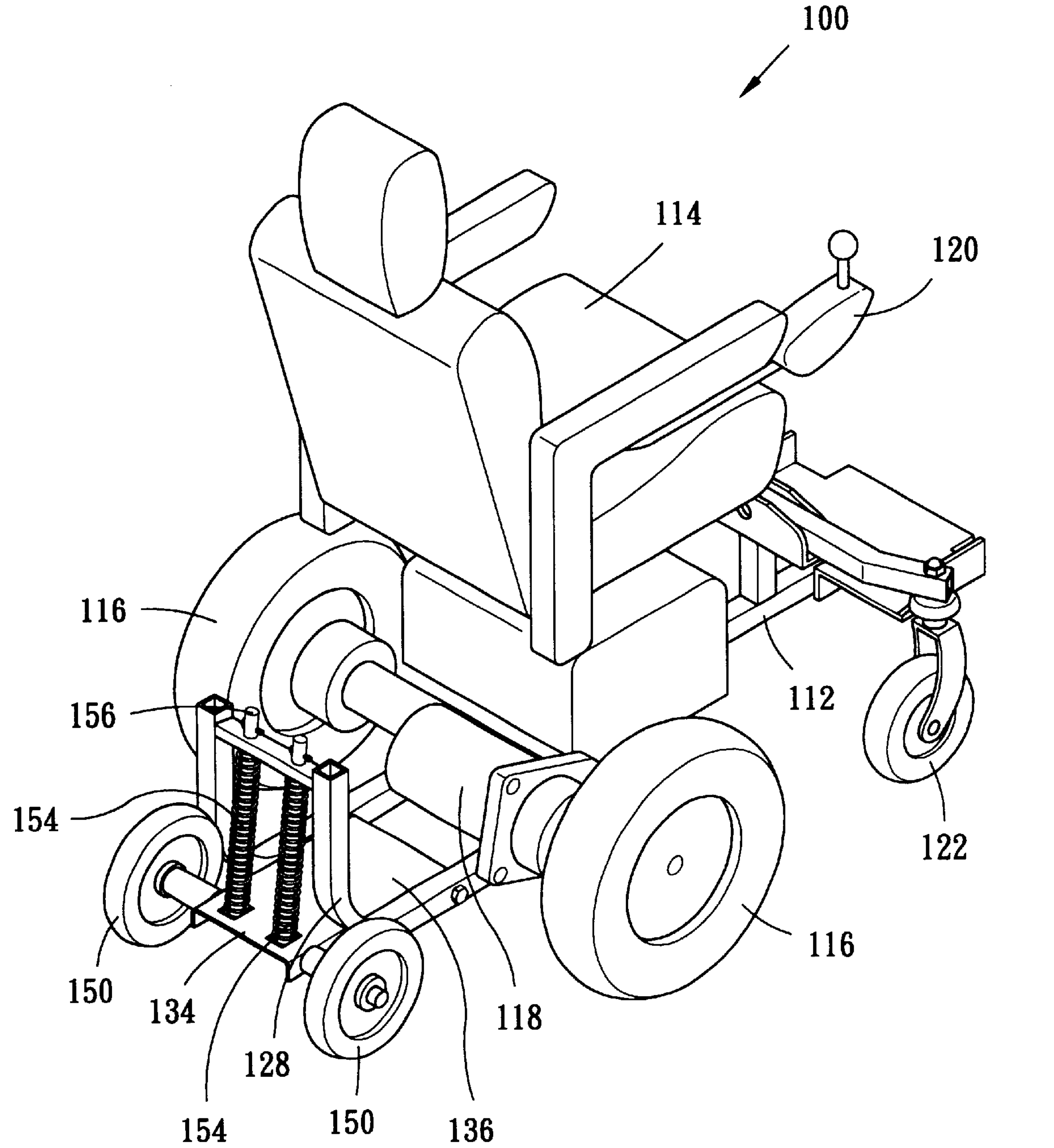
FIG. 1 is a perspective view of an electrical wheelchair constructed in accordance with a first embodiment of the present invention.
Figure 2:
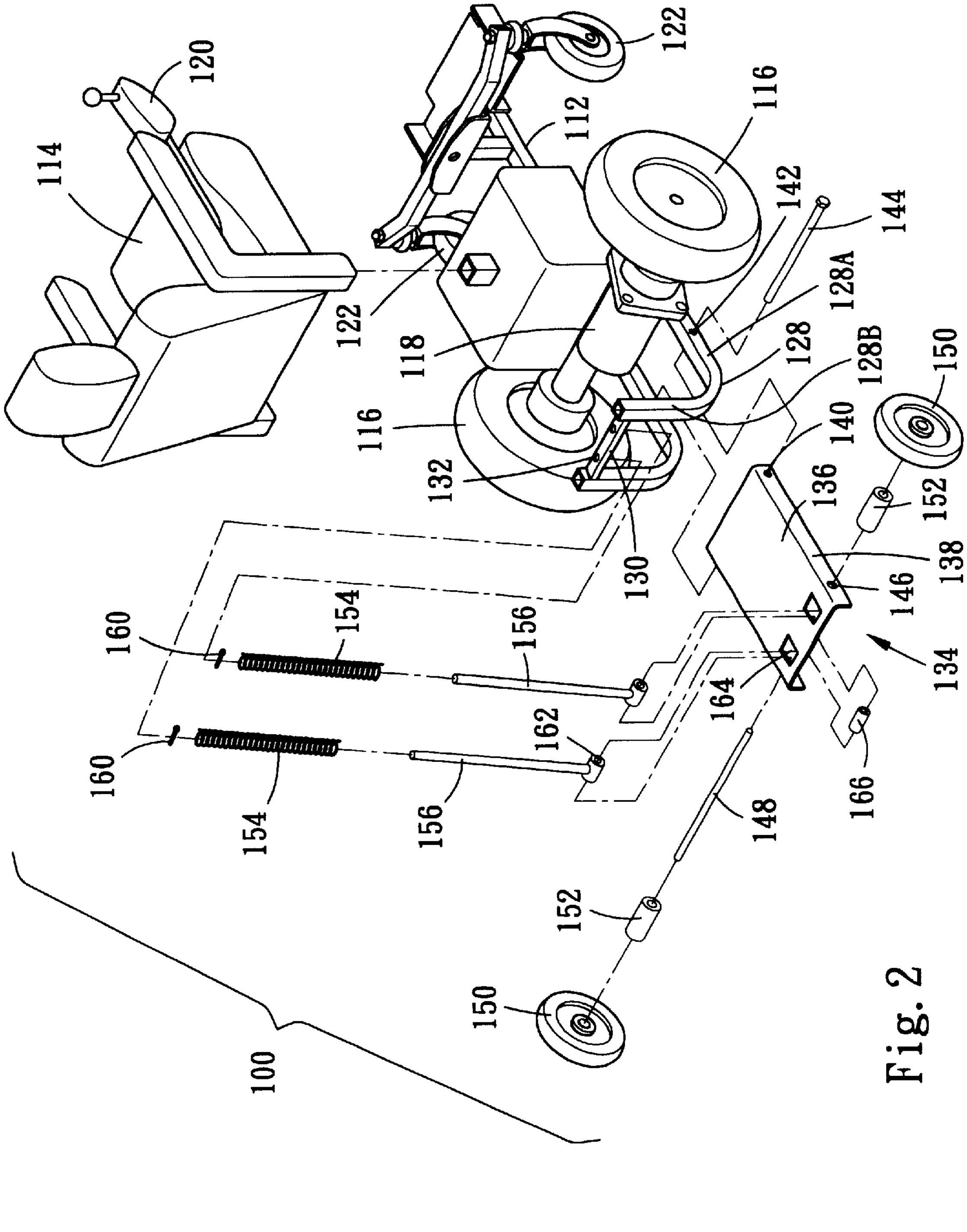
FIG. 2 is an exploded view of the electrical wheelchair of FIG. 1.

With reference to the drawings and in particular to FIGS. 1 and 2, an electrical wheelchair constructed in accordance with a first embodiment of the present invention, generally designated with reference numeral 100, comprises a chassis 112 on which a seat 114 is mounted to support a person (not shown) sitting on the wheelchair 100. Two wheels 116 are mounted on opposite sides of the chassis 112 and are driven by electrical driving means 118 for moving the wheelchair 100 forward and/or backward. The electrical driving means 118 can be any means suitable for driving the wheelchair 100 and is an electrical motor in the embodiment illustrated. The motor 118 is fixed in the chassis 112 and is controlled by a control unit 120 that is located in front of the seat 114 for ready access by the person sitting on the wheelchair 100. Two front casters 122 are mounted to a front side of the chassis 112 for smooth movement of the wheelchair 100 and for controlling moving direction thereof.

Two spaced, L-shaped rods 128 extend from a rear side of the chassis 112 whereby the rods 128 are substantially opposite to the front casters 122. Each rod 128 comprises a first, horizontal section 128A extending from the chassis 122 and a second, vertical section 128B extending from an end of the first section 128A in a substantially perpendicular manner. A cross bar 130 extends between and is fixed to the second sections 128B of the rods 128. Two through holes 132 are defined in the cross bar 130. The holes 132 will be further discussed hereinafter.

The electrical wheelchair 100 comprises an anti-turnover mechanism (not labeled) comprising a frame, generally designated with reference numeral 134 in the drawings. The frame 134 is arranged on the rear side of the chassis 112 and is sized to be received between the rods 128. The frame 134 comprises two side walls 138 connected together by a plate 136 straddling the side walls 138. First apertures 140 are respectively defined in the side walls 138 and aligned with each other. The first sections 128A of the rods 128 define through holes 142 corresponding to the first apertures 140. A shaft 144 extends through both the holes 142 and the first apertures 140 for pivotally mounting the frame 134 to the chassis 112 whereby the frame 134 is allowed to rotate with respect to the chassis 112.

The side walls 138 of the frame 134 define aligned second apertures 146 with a shaft 148 extending therethrough. The shaft 148 has opposite ends (not labeled) extending beyond the side walls 138. Two rear casters 150 are respectively mounted to the ends of the shaft 148. The casters 150 serve to prevent the wheelchair 100 from turnover. A collar 152 that is fit over the shaft 148 is provided between each rear caster 150 and the corresponding side wall 138 to reduce wearing and abrasion therebetween and to control distance between the rear casters 150.

The rear casters 150 are sized not to contact the ground surface when the wheelchair 100 is moving on a flat surface to enhance the movement of the wheelchair 100.

The anti-turnover mechanism further comprises two resilient members 154 which are helical springs in the embodiment illustrated. The resilient member 154 are arranged between the frame 134 and the cross bar 130 of the chassis 112. The resiliency of the resilient members 154 maintains the relative position between the frame 134 and the chassis 112 while allowing the relative position to be changed by deforming the resilient members 154 so as to change the relative position of the rear casters 150 with respect to the chassis 112. It is, however, noted that other resilient members can be employed to replace the helical springs shown in the drawings without departing from the scope of the present invention.

The springs 154 is mounted to the frame 134 and the cross bar 130 in any suitable manner. In the embodiment illustrated, each spring 154 encompasses a rod 156. The rod 156 has a first end (not labeled) extending through a corresponding one of the holes 132 of the cross bar 130 and is fixed thereto by a pin 160. The rod 156 has an opposite second end in which a hole 162 extending in a transverse direction is defined for the extension of the shaft 148. In the embodiment illustrated, a transversely-extending tube (not labeled) is formed on the second end of the rod 156 with the hole 162 defined therein and co-extending therewith. The tube serves to retain the second end of the spring 154. A slot 164 is defined in the plate 136 for the extension of the rod 156.

A collar 166 that is fit over the shaft 148 is arranged between the tubes of the rods 156 for reducing wearing and abrasion between the tubes. It is understood that the provision of the collar 166 is not absolutely necessary in exercising the present invention.

Figure 3:
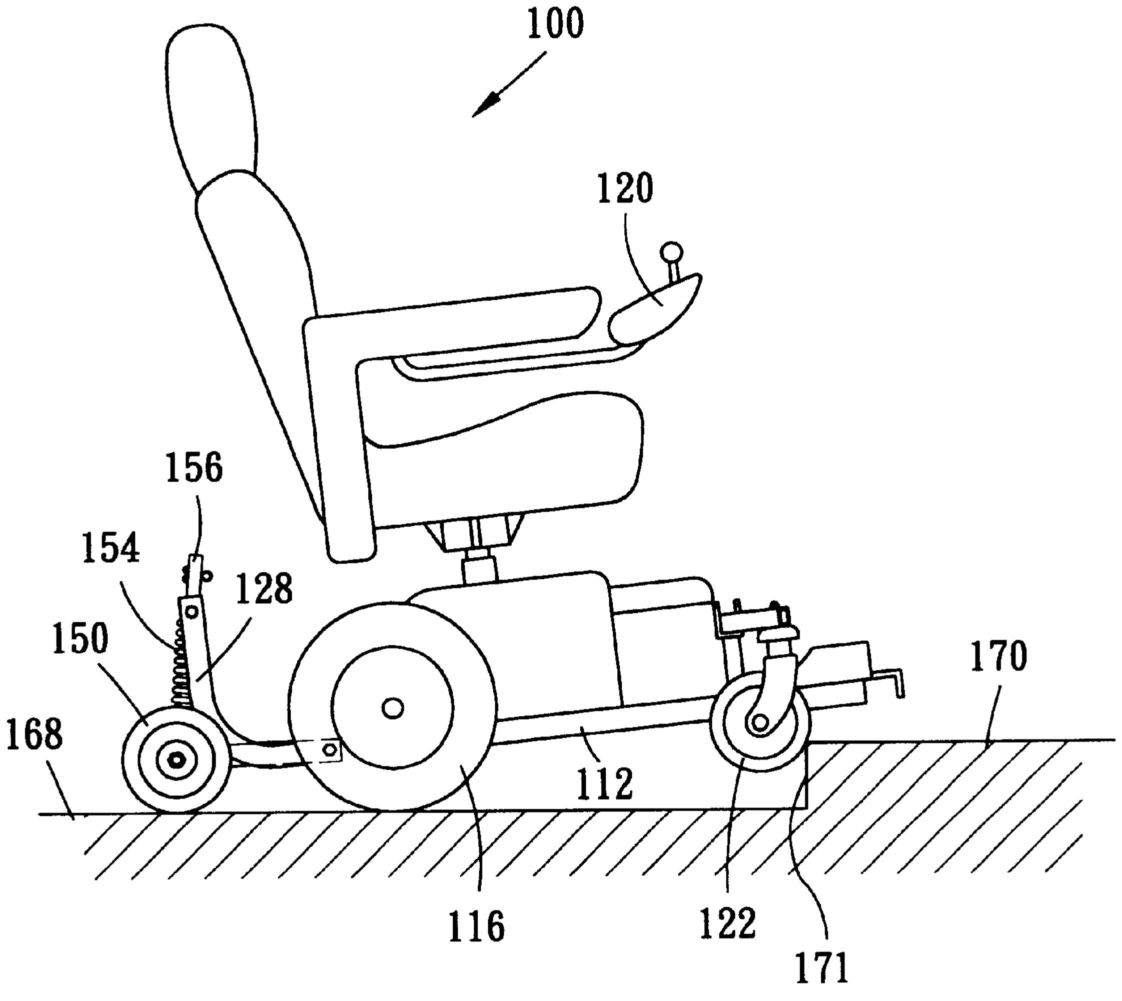
FIG. 3 is a side elevational view of the electrical wheelchair of the present invention, showing the wheelchair climbing a step-like raised surface in a first phase.
Figure 4:
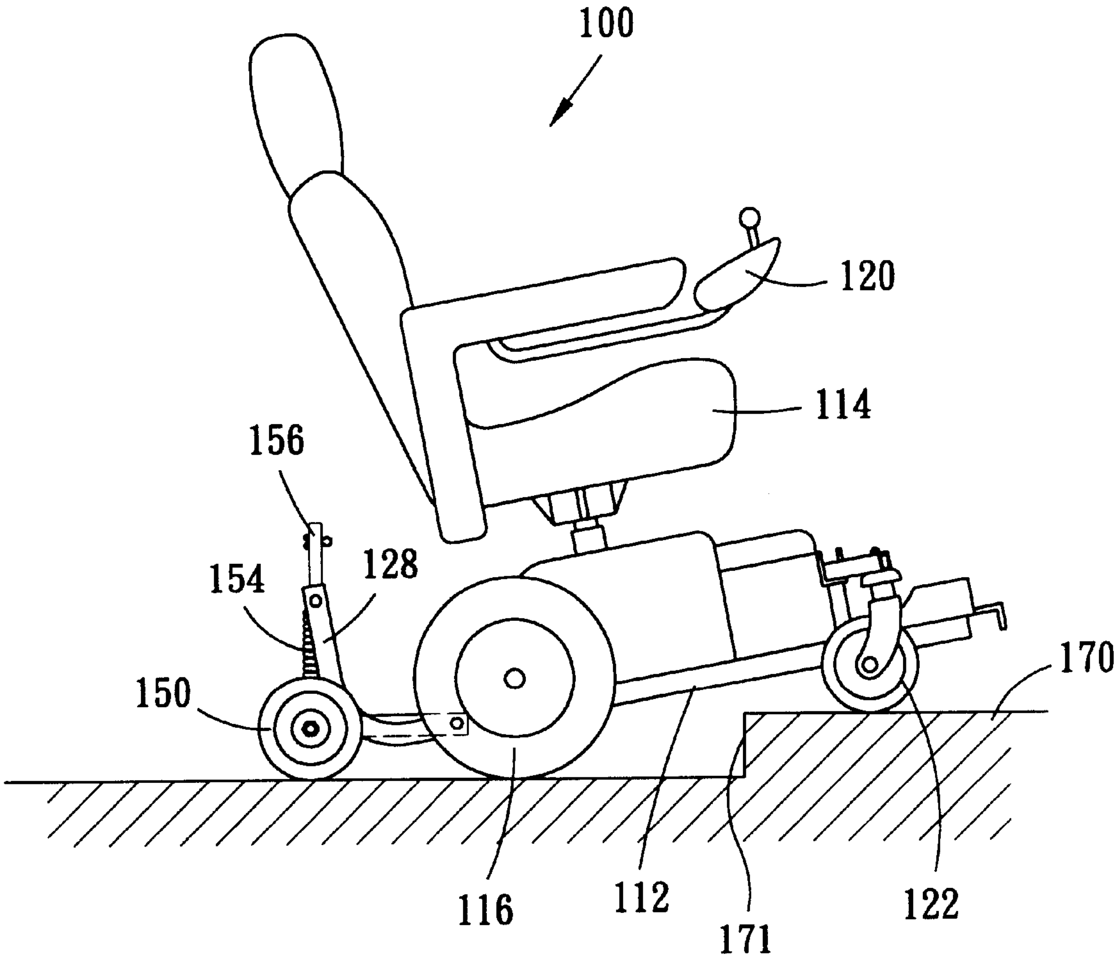
FIG. 4 is a side elevational view similar to FIG. 3 but showing the wheelchair climbing the raised surface in a second phase.
Figure 5:
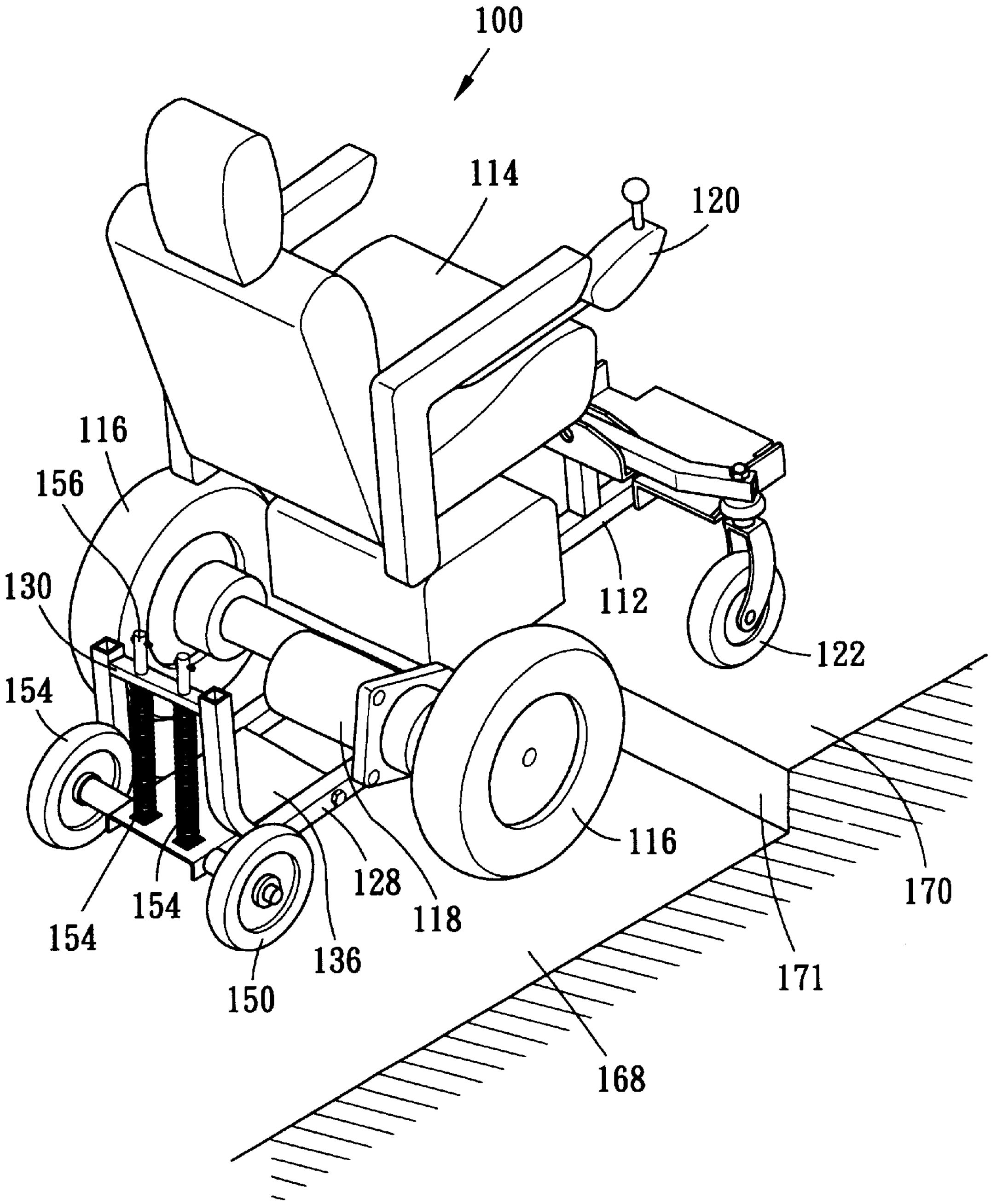
FIG. 5 is a perspective view of FIG. 4.
Figure 6:
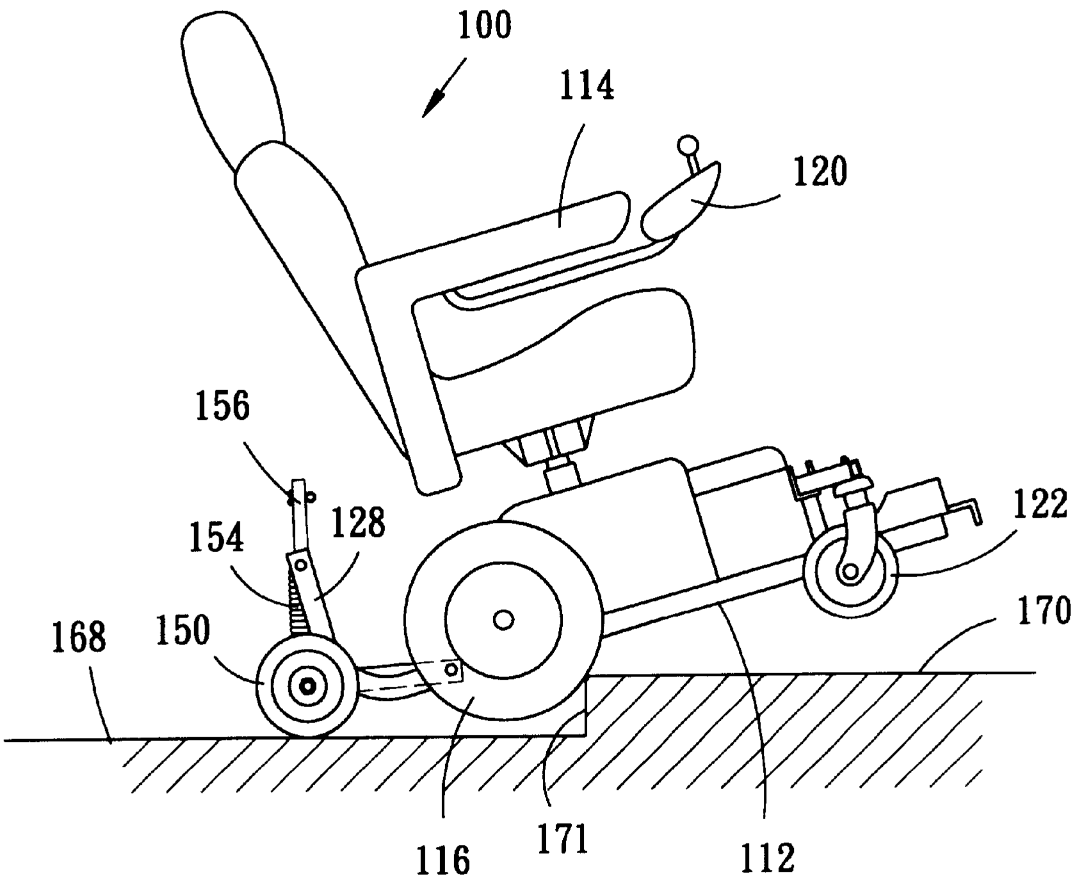
FIG. 6 is a side elevational view similar to FIGS. 3 and 4 but showing the wheelchair climbing the raised surface in a third phase.

Also referring to FIGS. 3–6, wherein FIGS. 3, 4 and 6 show three different phases of the operation of the wheelchair 100 in climbing over a step-like raised surface 170 from a lower surface 168, while FIG. 5 is a perspective view of FIG. 4, when the electrical wheelchair 100 is climbing the raised surface 170 from the lower surface 168, the front casters 122 contact a side face 171 of the step-like raised surface 170 first and move along the side face 171 up to the raised surface 170. This causes the chassis 112 and the seat 114 to tilt which in turn causes the rear casters 150 to contact the lower surface 168.

As shown in FIGS. 4 and 5, with the front casters 122 moving higher, the chassis 112 is further tilted rearward. This causes deformation of the resilient members 154 in order to change the relative position of the rear casters 150 with respect to the chassis 112 for accommodating the further tilting of the chassis 112.

When the front casters 122 eventually reaches the raised surface 170, further movement of the wheelchair 100 causes the wheels 116 to contact the side face 171 and move upward along the side face 171 as shown in FIG. 6. During the process, the resilient members 154 are maintained in a deformed condition. When the wheels 116 reaches the raised surface 170, the chassis 112 returns to its non-tilted condition and no force is applied to the resilient members 154. The resilient members 154 are allowed to spring back to their non-deformed condition. Energy stored in the deformed members 154 is thus released, causing a force acting upon the wheelchair 100 to forcibly drive the wheelchair 100 to the raised surface.

Figure 7:
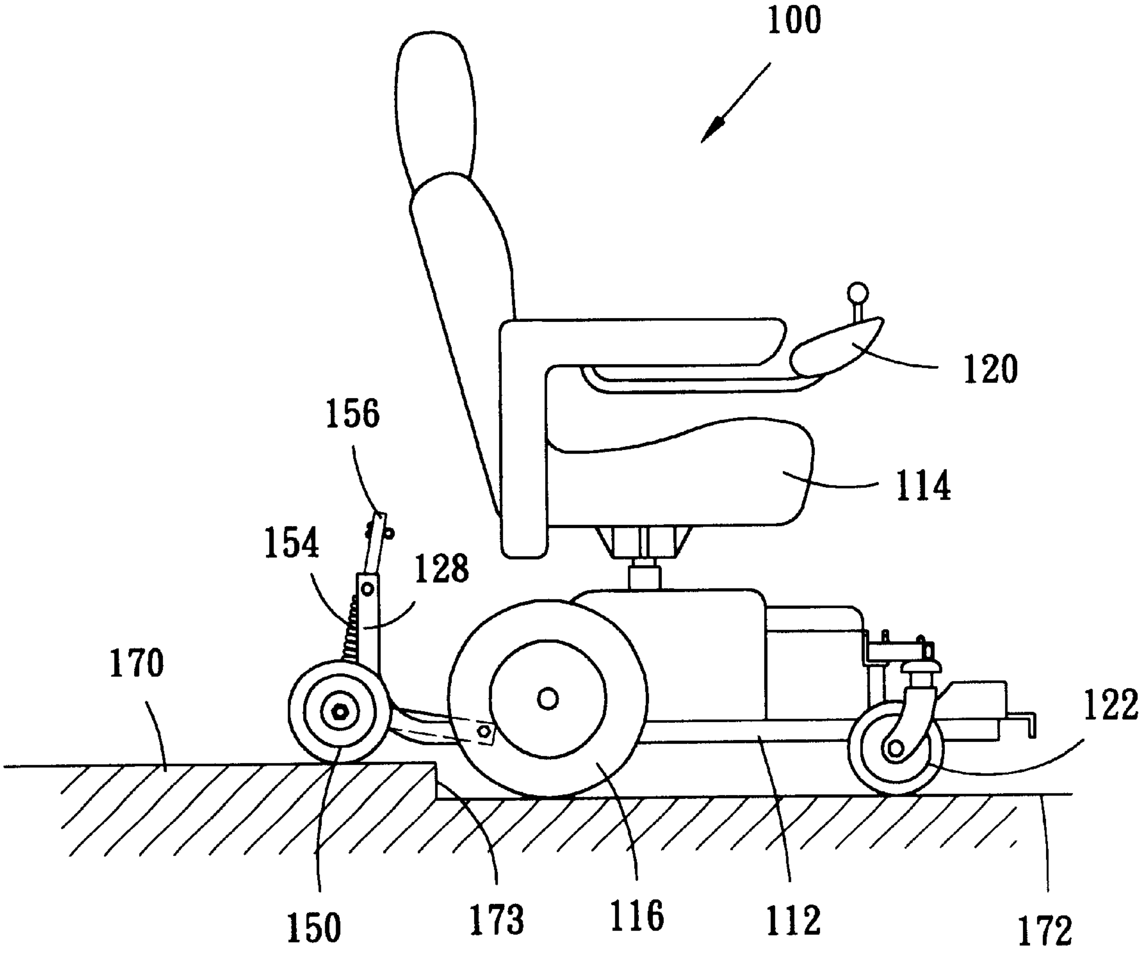
FIG. 7 is a side elevational view of the electrical wheelchair of the present invention, showing the wheelchair moving down the raised surface.

Further referring to FIG. 7, when the wheelchair 100 is moving down from the raised surface 170 to a lower surface 172, the wheels 116 are moved toward an edge 173 of the raised surface 170 and drops suddenly to the lower surface 172. This makes the rear casters 150 hit onto the raised surface 170, causing a shock to the wheelchair 100. Due to the resiliency of the resilient members 154, the shock is absorbed by the deformation of the resilient members 154. This reduces the discomfort caused by the shock to the person sitting on the wheelchair 100. When the wheelchair 100 moves forward, the resilient members 154 spring back to their non-deformed condition, releasing the energy stored therein. This helps to quickly drive the wheelchair 100 forward.

Figure 8:
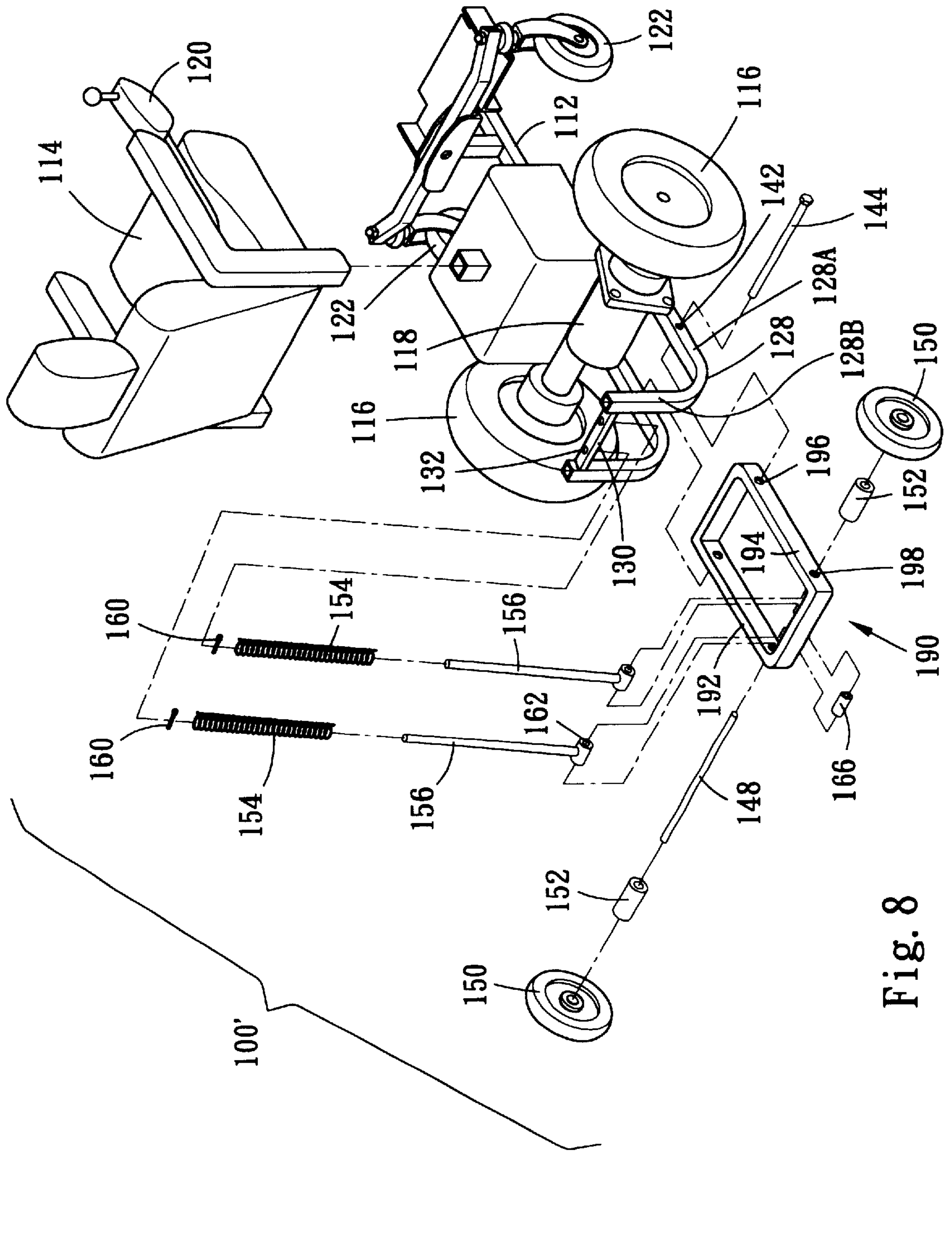
FIG. 8 is an exploded view of an electrical wheelchair constructed in accordance with a second embodiment of the present invention.

Referring to FIG. 8, an electrical wheelchair constructed in accordance with a second embodiment is shown and is designated with reference numeral 100'. The electrical wheelchair 100' of the second embodiment is similar to the electrical wheelchair 100 of the first embodiment with a modification made to the frame of the anti-turnover mechanism. The frame of the electrical wheelchair 100' of the second embodiment is generally designated with reference numeral 190 in the drawings, comprising a rectangular member 192 having opposite side walls 194 connected to each other by opposite end walls (not labeled). First and second apertures 196, 198 are defined in the side walls 194 for the extension of the shaft 144, 148, respectively. The remaining parts of the electrical wheelchair 100' of the second embodiment are substantially identical to those of the electrical wheelchair 100 of the first embodiment and bear with the same reference numerals. Thus, no further discussion is needed herein.

Figure 9:
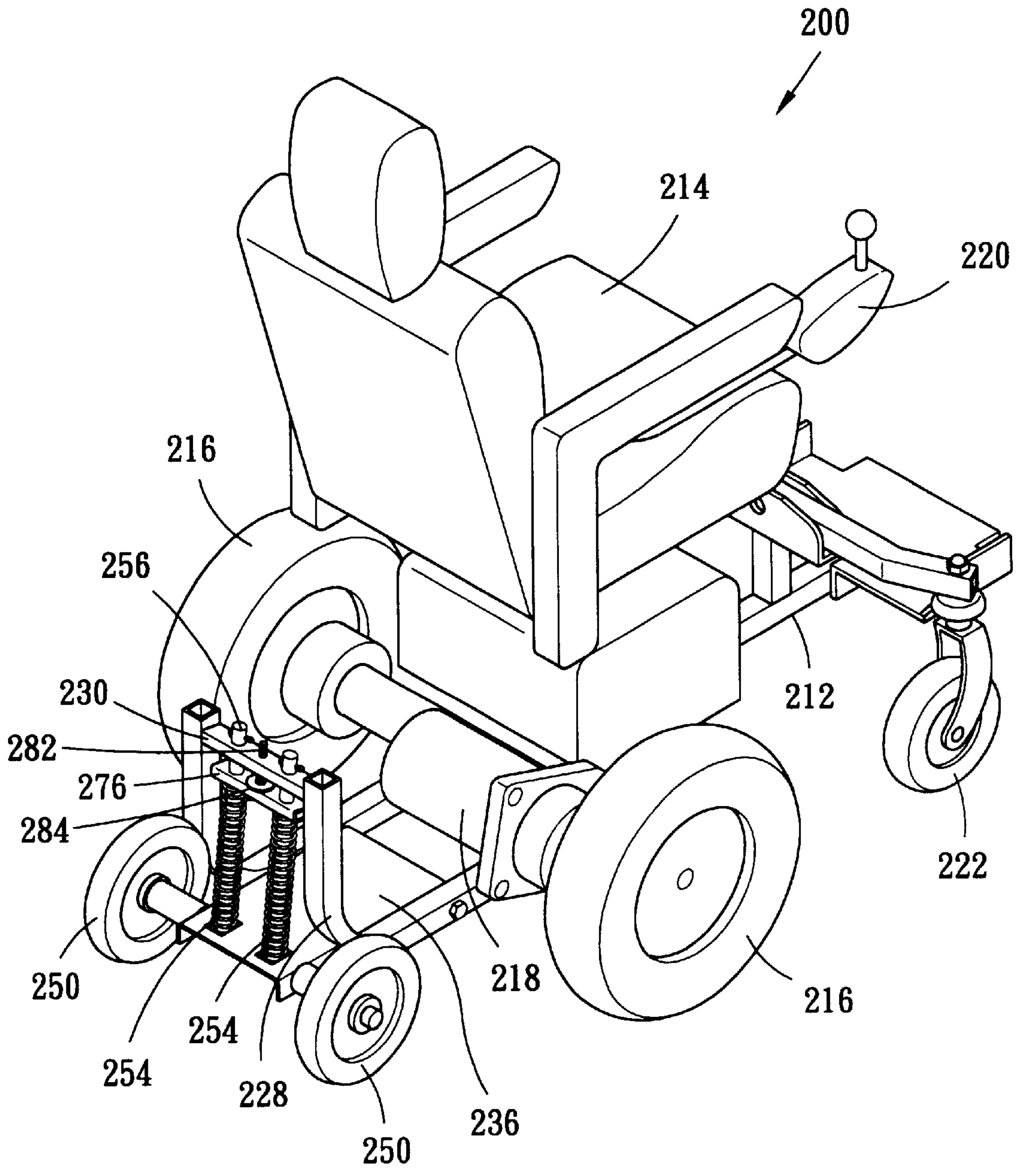
FIG. 9 is a perspective view of an electrical wheelchair constructed in accordance with a third embodiment of the present invention.
Figure 10:
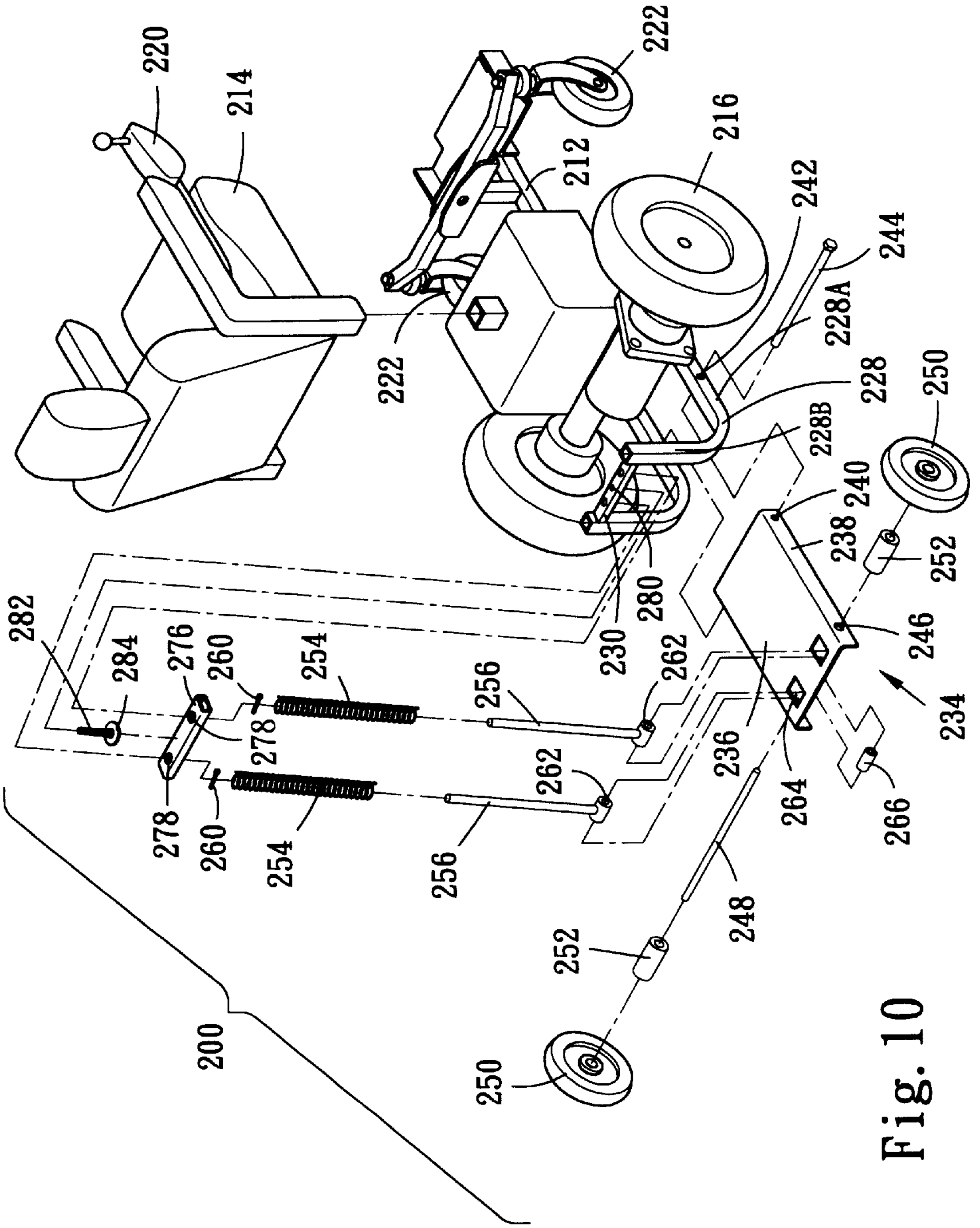
FIG. 10 is an exploded view of FIG. 9.

Referring to FIGS. 9 and 10, an electrical wheelchair constructed in accordance with a third embodiment of the present invention, generally designated with reference numeral 200, is shown. The electrical wheelchair 200 comprises a chassis 212 on which a seat 214 is mounted to support a person (not shown) sitting on the wheelchair 200. Two wheels 216 are mounted on opposite sides of the chassis 212 and are driven by electrical driving means 218 for moving the wheelchair 200 forward and/or backward. Similar to the first embodiment with reference to FIGS. 1–7, the electrical driving means 218 is any means suitable for driving the wheelchair 200, such as an electrical motor. The motor 218 is fixed in the chassis 212 and is controlled by a control unit 220 that is located in front of the seat 214 for ready access by the person sitting on the wheelchair 200. Two front casters 222 are mounted to a front side of the chassis 212 for smooth movement of the wheelchair 200 and for controlling moving direction thereof.

Two spaced, L-shaped rods 228 extend from a rear side of the chassis 212. Each rod 228 comprises a first, horizontal section 228A extending from the chassis 222 and a second, vertical section 228B extending from an end of the first section 228A in a substantially perpendicular manner. A cross bar 230 extends between and is fixed to the second sections 228B of the rods 228. Two through holes 232 are defined in the cross bar 230.

The electrical wheelchair 200 comprises an anti-turnover mechanism (not labeled) comprising a frame 234 arranged on the rear side of the chassis 212 and received between the rods 228. The frame 234 comprises two side walls 238 connected together by a plate 236 straddling the side walls 238. First apertures 240 are respectively defined in the side walls 238 and aligned with each other. The first sections 228A of the rods 228 define through holes 242 corresponding to the first apertures 240. A shaft 244 extends through both the holes 242 and the first apertures 240 for pivotally mounting the frame 234 to the chassis 212.

The side walls 238 of the frame 234 define aligned second apertures 246 with a shaft 248 extending therethrough. The shaft 248 has opposite ends (not labeled) extending beyond the side walls 238. Two rear casters 250 are respectively mounted to the ends of the shaft 248. The casters 250 serve to prevent the wheelchair 200 from turnover. A collar 252 that is fit over the shaft 248 is provided between each rear caster 250 and the corresponding side wall 238 to reduce wearing and abrasion therebetween and to control distance between the rear casters 250.

The anti-turnover mechanism further comprises two resilient members 254 which, similar to those of the first embodiment, are helical springs arranged between the frame 234 and the cross bar 230. The resiliency of the resilient members 254 supports the relative position between the frame 234 and the chassis 212 while allowing the relative position to be changed by deforming the resilient members 254 so as to change the relative position of the rear casters 250 with respect to the chassis 212.

The springs 254 are mounted to the frame 234 and the cross bar 230 in any suitable manner. For example, each spring 254 encompasses a rod 256, which has first and second ends (not labeled). A transversely-extending tube (not labeled) is formed on the second end of the rod 256 with a hole 262 defined therein and coextensive therewith for the extension of the shaft 248. A slot 264 is defined in the plate 236 for the extension of the second end of the rod 256.

The anti-turnover mechanism of the electrical wheel 200 further comprises an adjusting plate 276 in which two holes 278 are defined. The first ends of the rods 256 extend through the holes 278 and further extend through the holes 232 of the cross bar 230. The first end of each rod 256 is fixed to the cross bar 230 by a pin 260. The resilient members 254 are positioned between the adjusting plate 276 and the frame 234 for retaining the relative position of the frame 234 with respect to the chassis 212 while allowing relative rotation of the frame 234 with respect to the chassis 212.

The cross bar 230 further defines an inner-threaded hole 280 engaging a bolt 282. The bolt 282 has an expanded end portion 284 physically engaging the adjusting plate 276 whereby rotating the bolt 282 changes the distance between the adjusting plate 276 and the frame 234 which in turn changes the amount of deformation of the resilient members 254. Thus, the resilient members 254 are selectively preloaded. The adjusting plate 276 also provides means for compensating fatigue of the resilient members 254.

A collar 266 that is fit over the shaft 248 is arranged between the tubes of the rods 256 for reducing wearing and abrasion between the tubes. It is understood that the collar 266 is not absolutely necessary in exercising the present invention.

The operation of the electrical wheel 200 is substantially identical to that of the electrical wheels 100 and 100'. Thus, further description is not needed herein.

Figure 11:
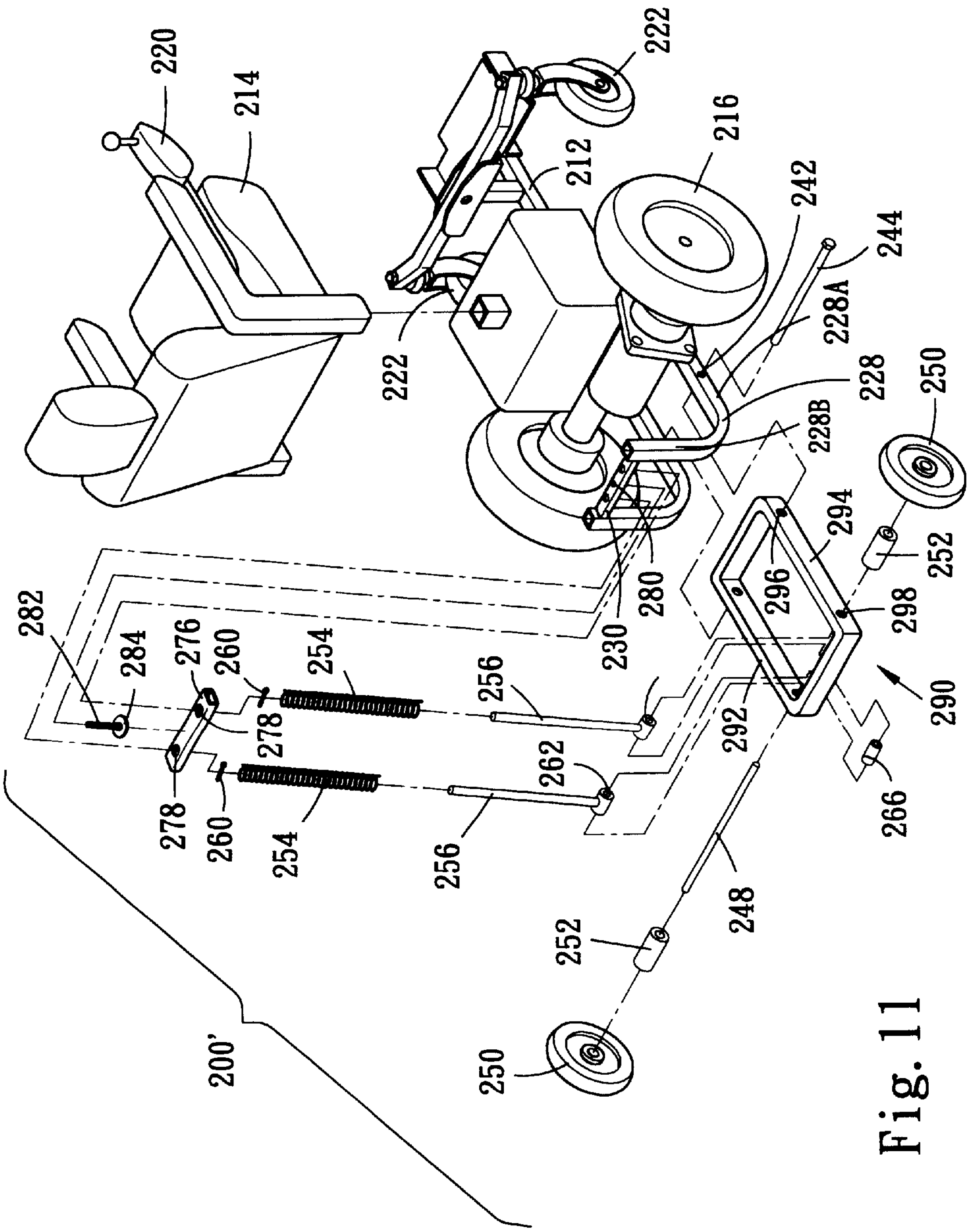
FIG. 11 is an exploded view of an electrical wheelchair constructed in accordance with a fourth embodiment of the present invention.

Referring to FIG. 11, an electrical wheelchair constructed in accordance with a fourth embodiment is shown and is designated with reference numeral 200'. The electrical wheelchair 200' of the fourth embodiment is similar to the electrical wheelchair 200 of the third embodiment with a modification made to the frame of the anti-turnover mechanism. The frame of the electrical wheelchair 200' of the fourth embodiment is generally designated with reference numeral 290 in the drawings, comprising a rectangular member 292 having opposite side walls 294 connected to each other by opposite end walls (not labeled). First and second apertures 296, 298 are defined in the side walls 294 for the extension of the shaft 244, 248, respectively. The remaining parts of the electrical wheelchair 200' of the fourth embodiment are substantially identical to those of the electrical wheelchair 200 of the third embodiment and bear with the same reference numerals. Thus, no further discussion is needed herein.

Figure 12:
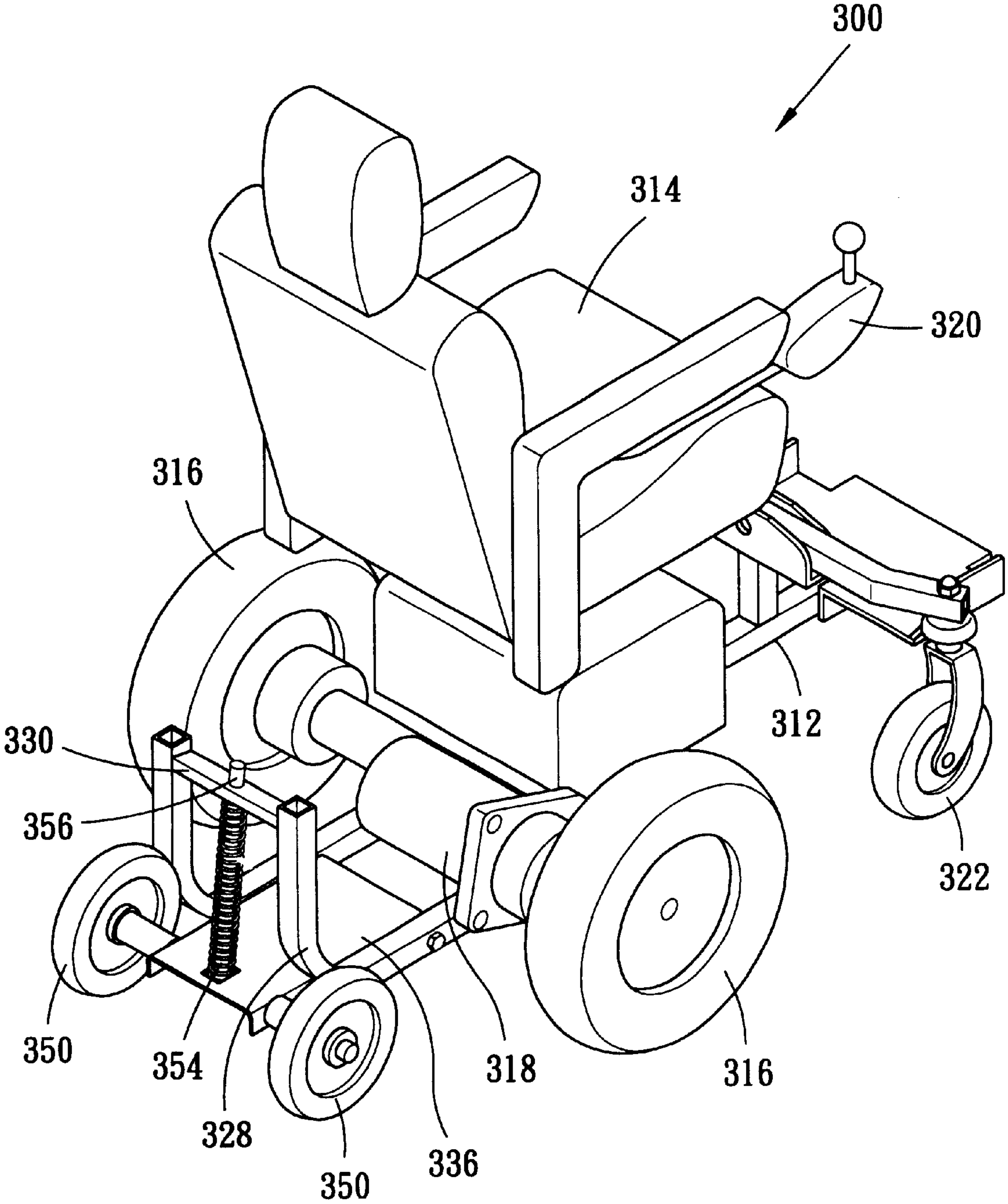
FIG. 12 is a perspective view of an electrical wheelchair constructed in accordance with a fifth embodiment of the present invention.
Figure 13:
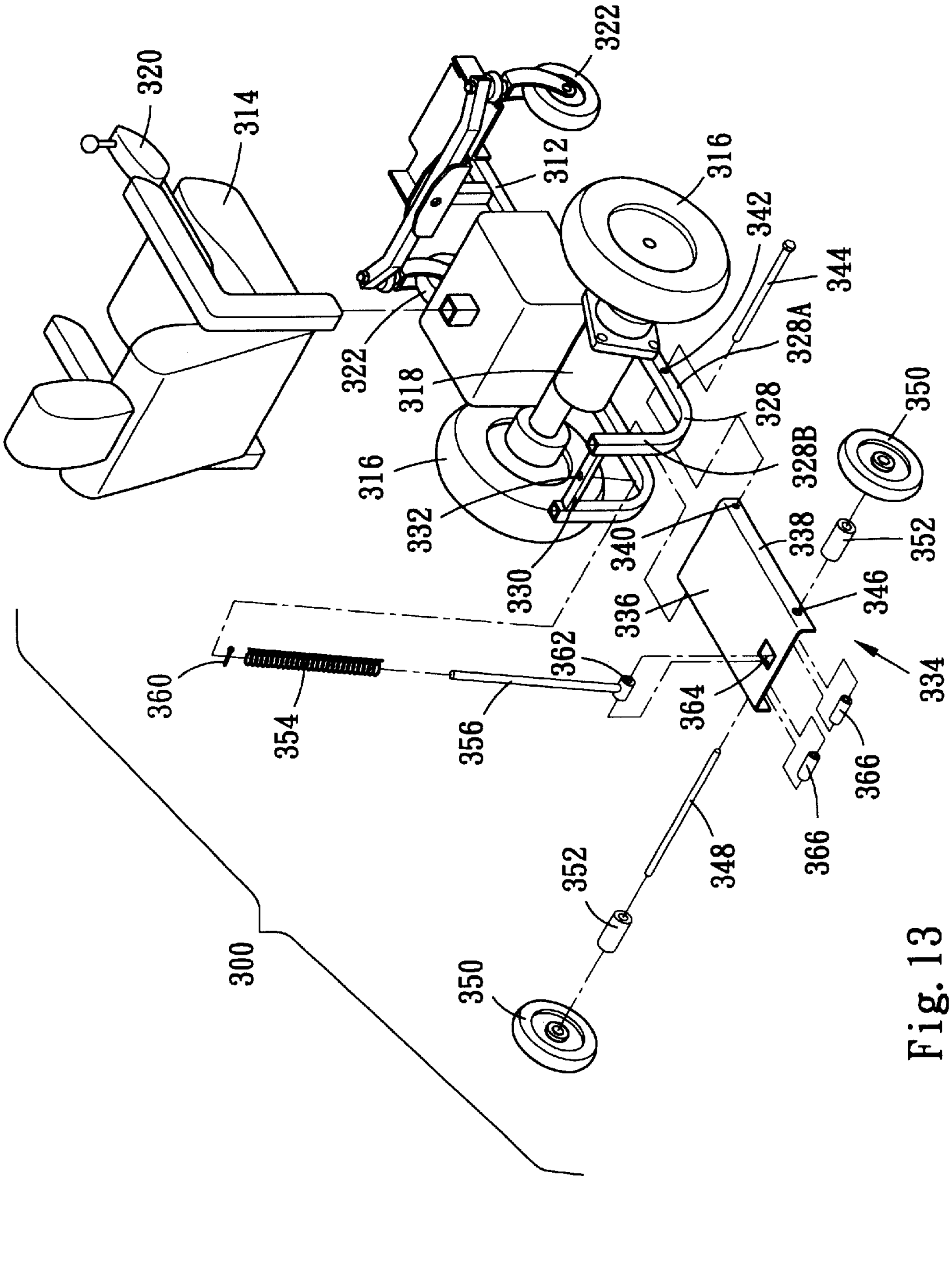
FIG. 13 is an exploded view of FIG. 12.

Referring to FIGS. 12 and 13, an electrical wheelchair constructed in accordance with a fifth embodiment of the present invention, generally designated with reference numeral 300, is shown. The electrical wheelchair 300 comprises a chassis 312 on which a seat 314 is mounted to support a person (not shown) sitting on the wheelchair 300. Two wheels 316 are mounted on opposite sides of the chassis 312 and are driven by electrical driving means 318 for moving the wheelchair 300 forward and/or backward. Similar to the embodiments discussed previously with reference to FIGS. 1–11, the electrical driving means 318 can be any means suitable for driving the wheelchair 300, such as an electrical motor. The motor 318 is fixed in the chassis 312 and is controlled by a control unit 320 that is located in front of the seat 314 for ready access by the person sitting on the wheelchair 300. Two front casters 322 are mounted to a front side of the chassis 312 for smooth movement of the wheelchair 300 and for controlling moving direction thereof.

Two spaced, L-shaped rods 328 extend from a rear side of the chassis 312. Each rod 328 comprises a first, horizontal section 328A extending from the chassis 322 and a second, vertical section 328B extending from an end of the first section 328A in a substantially perpendicular manner. A cross bar 330 extends between and is fixed to the second sections 328B of the rods 328. A through hole 332 is defined in the cross bar 330.

The electrical wheelchair 300 comprises an anti-turnover mechanism (not labeled) comprising a frame 334 arranged on the rear side of the chassis 312 and received between the rods 328. The frame 334 comprises two side walls 338 connected together by a plate 336 straddling the side walls 338. First apertures 340 are respectively defined in the side walls 338 and aligned with each other. The first sections 328A of the rods 328 define through holes 342 corresponding to the first apertures 340. A shaft 344 extends through both the holes 342 and the first apertures 340 for pivotally mounting the frame 334 to the chassis 312.

The side walls 338 of the frame 334 define aligned second apertures 346 with a shaft 348 extending therethrough. The shaft 348 has opposite ends (not labeled) extending beyond the side walls 338. Two rear casters 350 are respectively mounted to the ends of the shaft 348. The casters 350 serve to prevent the wheelchair 300 from turnover. A collar 352 that is fit over the shaft 348 is provided between each rear caster 350 and the corresponding side wall 338 to reduce wearing and abrasion therebetween and to control distance between the rear casters 350.

The anti-turnover mechanism further comprises a resilient member 354 which, similar to the counterpart of the previously-discussed embodiments, is a helical spring arranged between the frame 334 and the cross bar 330. The resiliency of the resilient member 354 supports the relative position between the frame 334 and the chassis 312 while allowing the relative position to be changed by deforming the resilient member 354 so as to change the relative position of the rear casters 350 with respect to the chassis 312.

The spring 354 is mounted to the frame 334 and the cross bar 330 in any suitable manner. For example, the spring 354 encompasses a rod 356 which has first and second ends (not labeled). A transversely-extending tube (not labeled) is formed on the second end of the rod 356 with a hole 362 defined therein and coextensive therewith for the extension of the shaft 348. A slot 364 is defined in the plate 236 for the extension of the second end of the rod 356. The first end of the rod 356 extends through the hole 332 of the cross bar 330 and is fixed to the cross bar 330 by a pin 360.

A collar 366 that is fit over the shaft 348 is arranged between the tube of the rod 356 and each side wall 338 of the frame 334 for reducing wearing and abrasion therebetween. It is understood that the collars 366 are not absolutely necessary in exercising the present invention.

The operation of the electrical wheel 300 is substantially identical to that of the electrical wheels 100, 100', 200 and 200'. Thus, further description is not needed herein.

Figure 14:
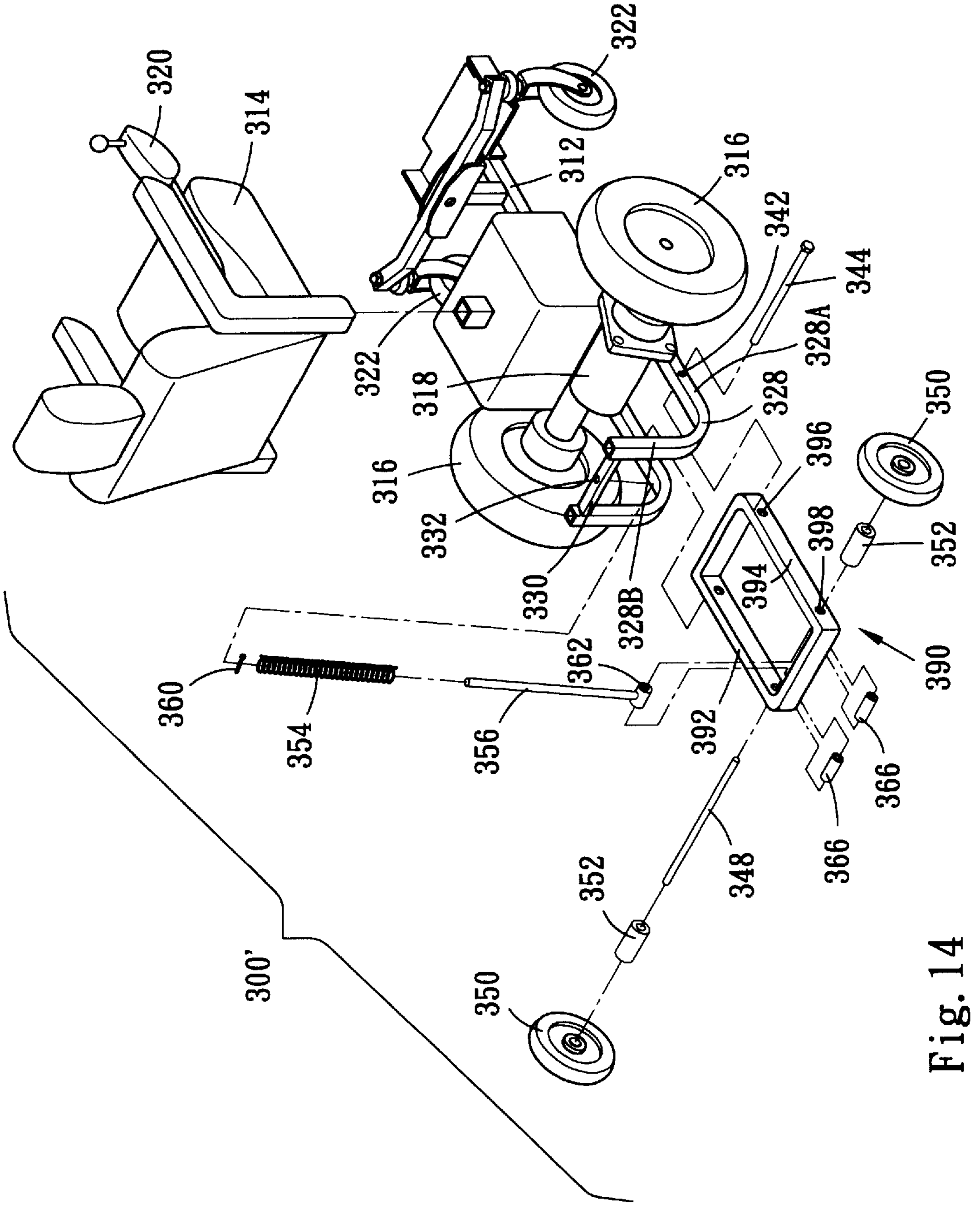
FIG. 14 is an exploded view of an electrical wheelchair constructed in accordance with a sixth embodiment of the present invention.
Figure 15:
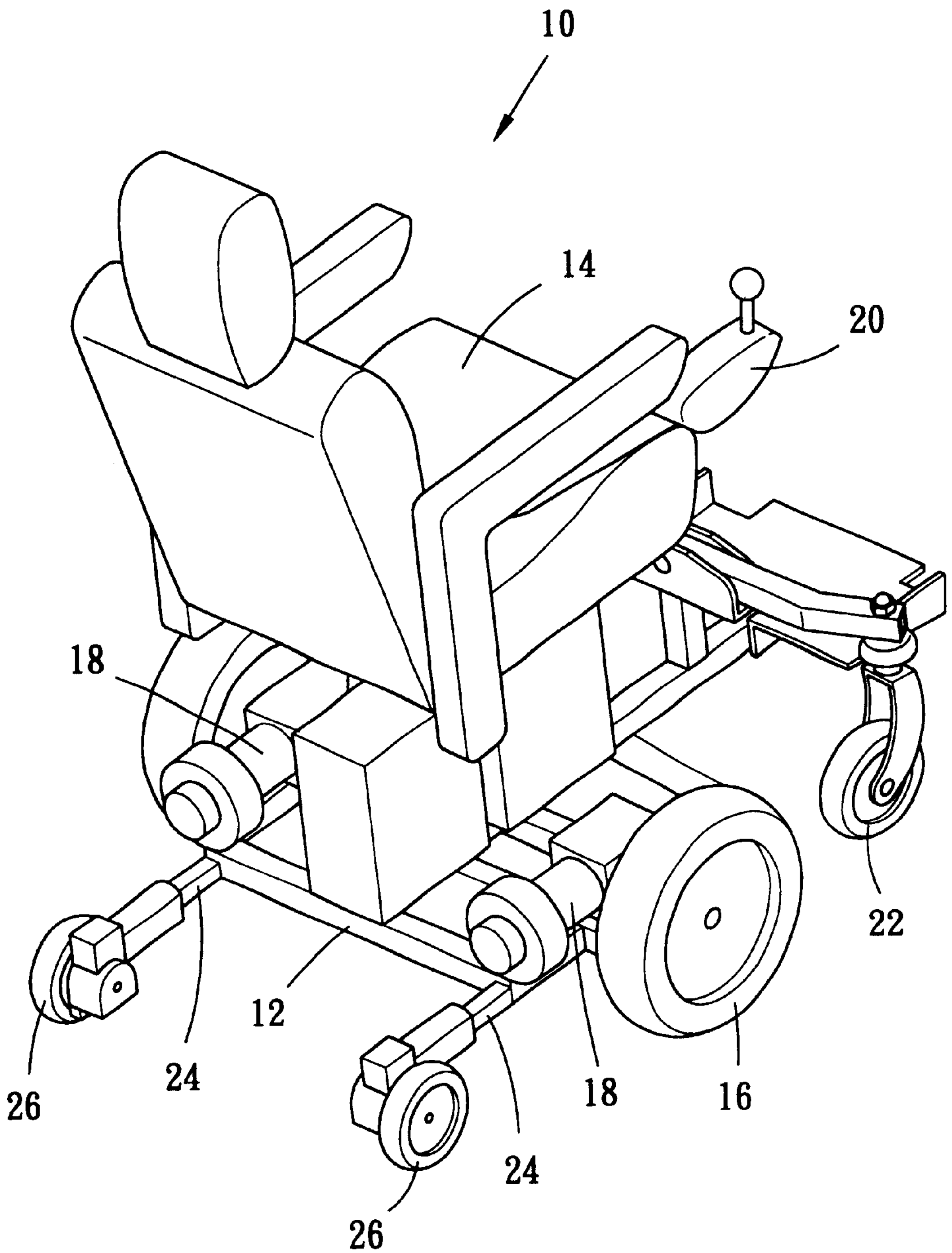
Fig. 15 PRIOR ART
FIG. 15 is a perspective view of a conventional electrical wheelchair.

Referring to FIG. 14, an electrical wheelchair constructed in accordance with a sixth embodiment is shown and is designated with reference numeral 300'. The electrical wheelchair 300' of the sixth embodiment is similar to the electrical wheelchair 300 of the fifth embodiment with a modification made to the frame of the anti-turnover mechanism. The frame of the electrical wheelchair 300' of the sixth embodiment is generally designated with reference numeral 390 in the drawings, comprises a rectangular member 392 having opposite side walls 394 connected to each other by opposite end walls (not labeled). First and second apertures 396, 398 are defined in the side walls 394 for the extension of the shaft 344, 348, respectively. The remaining parts of the electrical wheelchair 300' of the sixth embodiment are substantially identical to those of the electrical wheelchair 300 of the fifth embodiment and bear with the same reference numerals. Thus, no further discussion is needed herein.

Although the present invention has been described with reference to the preferred embodiments with reference to the drawings thereof, it is apparent to those skilled in the art that a variety of modifications and changes may be made without departing from the scope of the present invention which is intended to be defined by the appended claims.

What is claimed is:

1. An electrical wheelchair comprising:

a chassis to which wheels are mounted, the chassis comprising two L-shaped rods, each said rod comprising a first section extending from the chassis and a second section vertically extending from the first section, with a cross bar fixed between the second sections of the rods, the resilient member being mounted between the cross bar and the frame, and an anti-turnover mechanism comprising:

a frame pivoted to the chassis, casters rotatably mounted to the frame, and a resilient member mounted between the frame and the chassis for supporting relative position of the frame with respect to the chassis while allowing the relative position to be changed by deformation of the resilient member caused by relative rotation of the frame with respect to the chassis.

2. The electrical wheelchair as claimed in claim 1, wherein the frame comprises two side walls connected to each other by a plate straddling the side walls, the side walls defining aligned holes, the chassis comprising two spaced rods accommodating the frame therebetween, each rod defining a hole corresponding to the aligned holes of the frame, a shaft extending through the holes of the frame and the holes of the rods of the chassis to pivot the frame to the chassis.

3. The electrical wheelchair as claimed in claim 1, wherein the frame comprises two side walls connected to each other by opposite end walls, the side walls defining aligned holes, the chassis comprising two spaced rods accommodating the frame therebetween, each rod defining a hole corresponding to the aligned holes of the frame, a shaft extending through the holes of the frame and the holes of the rods of the chassis to pivot the frame to the chassis.

4. The electrical wheelchair as claimed in claim 1, wherein the frame forms a pivotal extension of the chassis with the casters rotatable mounted thereto, the frame being connected to the chassis by means of springs.

5. The electrical wheelchair as claimed in claim 1, wherein the resilient member comprises a helical spring encompassing a rod having first and second ends respectively attached to the cross bar and the frame.

6. The electrical wheelchair as claimed in claim 5, wherein the first end of the rod extends through a hole defined in the cross bar and fixed thereto by a pin.

7. The electrical wheelchair as claimed in claim 5, wherein the second end of the rod defines a transversely-extending hole through which a shaft that is rotatably supported in the frame extends.

8. The electrical wheelchair as claimed in claim 7, wherein opposite ends of the shaft extend beyond opposite sides of the frame to which the casters are mounted.

9. The electrical wheelchair as claimed in claim 8, wherein the frame comprises two side walls defining aligned holes through which the shaft extends.

10. The electrical wheelchair as claimed in claim 9, wherein a collar is fit over the shaft and located between each caster and the corresponding side wall of the frame.

11. The electrical wheelchair as claimed in claim 1, wherein the anti-turnover mechanism comprises two resilient members mounted between the chassis and the frame.

12. The electrical wheelchair as claimed in claim 1, wherein the anti-turnover mechanism comprises means for pre-loading the resilient member.

13. An electrical wheelchair comprising:

a chassis to which wheels are mounted, and an anti-turnover mechanism comprising:

a frame pivoted to the chassis, casters rotatably mounted to the frame, a resilient member mounted between the frame and the chassis for supporting relative position of the frame with respect to the chassis while allowing the relative position to be changed by deformation of the resilient member caused by relative rotation of the frame with respect to the chassis, and a means for pre-loading the resilient member comprising a bolt threaded into an inner-threaded hole defined in the chassis, the bolt having an expanded end portion physically engaging a movable member, the resilient member being arranged between the frame and the movable member, distance between the movable member and the frame being adjustable by rotating the bolt to move the movable member with respect to the frame to pre-load the resilient member.

14. The electrical wheelchair as claimed in claim 13, wherein the chassis comprises two spaced, L-shaped rods, each comprising a first section extending from the chassis and a second section vertically extending from the first section, a cross bar fixed between the second sections of the rods, the inner-threaded hole being defined in the cross bar with the expanded end portion engaging the movable member, the resilient member being mounted between the movable member and the frame.

15. The electrical wheelchair as claimed in claim 14, wherein the anti-turnover mechanism comprises two resilient members mounted between the movable member and the frame.

16. The electrical wheelchair as claimed in claim 13, wherein the resilient members comprise helical springs each encompassing a rod having first and second ends respectively attached to the cross bar and the frame.

17. The electrical wheelchair as claimed in claim 16, wherein the first end of each rod extends through a hole defined in the cross bar and fixed thereto by a pin.

18. The electrical wheelchair as claimed in claim 16, wherein the first end of the rod extends through a hole defined in the movable member and a hole defined in the cross bar, the helical spring being arranged between the movable member and the frame.

* * * * *